US011046307B2

(12) United States Patent
Suzuki et al.

(10) Patent No.: US 11,046,307 B2
(45) Date of Patent: Jun. 29, 2021

(54) PARKING CONTROL METHOD AND PARKING CONTROL DEVICE

(71) Applicants: Nissan Motor Co., Ltd., Yokohama (JP); Renault S.A.S., Boulogne-Billancourt (FR)

(72) Inventors: Yasuhiro Suzuki, Kanagawa (JP); Yasuhisa Hayakawa, Kanagawa (JP); Yohei Taniguchi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 43 days.

(21) Appl. No.: 16/339,125

(22) PCT Filed: Oct. 4, 2016

(86) PCT No.: PCT/JP2016/079501
§ 371 (c)(1),
(2) Date: Apr. 3, 2019

(87) PCT Pub. No.: WO2018/066068
PCT Pub. Date: Apr. 12, 2018

(65) Prior Publication Data
US 2020/0047745 A1 Feb. 13, 2020

(51) Int. Cl.
*B60W 30/06* (2006.01)
*B60W 40/08* (2012.01)
*G05D 1/00* (2006.01)

(52) U.S. Cl.
CPC ............ *B60W 30/06* (2013.01); *B60W 40/08* (2013.01); *G05D 1/0088* (2013.01);
(Continued)

(58) Field of Classification Search
CPC ........ G05D 1/0088; G05D 2201/0213; B60W 40/08; B60W 30/06; B60W 30/0953;
(Continued)

(56) References Cited

U.S. PATENT DOCUMENTS 8,527,146 B1 * 9/2013 Jackson ............ B60W 50/0098
701/36
8,849,494 B1 * 9/2014 Herbach ........... B60W 60/0015
701/24
(Continued)

FOREIGN PATENT DOCUMENTS

CN 107614344 A 1/2018
JP H09050596 A 2/1997
(Continued)

OTHER PUBLICATIONS

Driversed.com; "Parking on a Hill"; driversed.com/driving-information/driving-techniquest/parking-on-a-hill.aspx; available Aug. 9, 2014 (Year: 2014).*
(Continued)

Primary Examiner — Stephen Holwerda
(74) Attorney, Agent, or Firm — Young Basile Hanlon & MacFarlane, P.C.

(57) ABSTRACT

A parking control apparatus includes an input device configured to acquire an operation command acquired from inside or outside of a vehicle and a control device configured to control the vehicle in accordance with the operation command. The control device is configured to make a determination whether or not an occupant is present inside a vehicle interior of the vehicle and control the vehicle to park in accordance with a result of the determination.

14 Claims, 14 Drawing Sheets

(52) U.S. Cl.
CPC . *B60W 2040/0881* (2013.01); *B60W 2400/00* (2013.01); *B60W 2520/04* (2013.01); *B60W 2720/106* (2013.01); *G05D 2201/0213* (2013.01)

(58) Field of Classification Search
CPC ..... B60W 2720/125; B60W 2720/106; B60W 2520/04; B60W 2040/0881; B60W 2710/205; B60W 2400/00; B60W 2720/14; B60W 2720/10
See application file for complete search history.

(56) References Cited

U.S. PATENT DOCUMENTS

| | | | | |
|---|---|---|---|---|
| 2011/0004375 A1* | 1/2011 | Hueger | ............. | B62D 15/0285 701/41 |
| 2011/0199236 A1* | 8/2011 | Hauber | ................ | B62D 15/027 340/932.2 |
| 2013/0085640 A1* | 4/2013 | Hong | ................ | B62D 15/0285 701/41 |
| 2014/0121930 A1* | 5/2014 | Allexi | .................. | B60W 30/06 701/70 |
| 2015/0203111 A1* | 7/2015 | Bonnet | ................ | B62D 15/027 701/25 |
| 2015/0344028 A1* | 12/2015 | Gieseke | ............... | B62D 15/028 701/1 |
| 2016/0075328 A1* | 3/2016 | Kiyokawa | ............. | B60W 30/06 701/41 |
| 2016/0077525 A1 | 3/2016 | Tomozawa et al. | | |
| 2017/0139415 A1* | 5/2017 | Stefan | .................. | G05D 1/0088 |
| 2018/0037262 A1 | 2/2018 | Imai | | |
| 2018/0093631 A1* | 4/2018 | Lee | ..................... | B60W 50/082 |
| 2018/0111610 A1* | 4/2018 | Romainczyk | ......... | B60W 50/14 |
| 2020/0148263 A1 | 5/2020 | Imai | | |

FOREIGN PATENT DOCUMENTS

| | | |
|---|---|---|
| JP | 2004203117 A | 7/2004 |
| JP | 2008137442 A | 6/2008 |
| JP | 2008174192 A | 7/2008 |
| JP | 2016060224 A | 4/2016 |
| JP | 2016185745 A | 10/2016 |
| WO | 2014162753 A1 | 10/2014 |

OTHER PUBLICATIONS

Driversed; "Parking on a Hill"; driversed.com; Aug. 9, 2014 (Year: 2014).*

* cited by examiner

FIG. 3

| | Evaluation item | Control parameter | | |
|---|---|---|---|---|
| | | First parameter Occupant is present | | Second parameter Occupant is absent |
| Parking route calculation | Length of route | LR1 | > | LR2 |
| | Maximum curvature | MR1 | < | MR2 |
| | Maximum curvature change rate | CR1 | < | CR2 |
| | Upper limit steering speed | SRR1 | < | SRR2 |
| | Weighting 1: Shortness of time required for parking | TVR1 | < | TVR2 |
| | Weighting 2: Smoothness of behavior of vehicle | SR1 | > | SR2 |

FIG. 5

| | Evaluation item | Control parameter | | |
|---|---|---|---|---|
| | | First parameter Occupant is present | | Second parameter Occupant is absent |
| Target speed calculation | Vehicle speed | VR1 | < | VR2 |
| | Upper limit acceleration | AR1 | < | AR2 |
| | Upper limit deceleration | DR1 | < | DR2 |
| | Upper limit yaw rate | YR1 | < | YR2 |
| | Upper limit lateral acceleration | HAR1 | < | HAR2 |
| | Upper limit steering speed | SRR1 | < | SRR2 |
| | Upper limit jerk | STJR1 | < | STJR2 |
| | Deceleration when stopping | SDR1 | < | SDR2 |
| | Deceleration time when stopping | STRR1 | > | STRR2 |
| | Stop position margin | MR1 | > | MR2 |
| | Weighting 1: Shortness of time required for parking | TVR1 | < | TVR2 |
| | Weighting 2: Smoothness of behavior of vehicle | SR1 | > | SR2 | lane width[m], spot width[m], lat[m],
init[deg], fin[deg]

T1: 18.0[s], T2: 20.9[s], total: 38.9[s]

T1:7.3[s], T2:9.4[s], total:16.8[s]

T1:21.7[s], T2:20.0[s], T3:10.0[s], T4:19.8[s], total:71.4[s]

T1:9.6[s], T2:8.6[s], T3:3.7[s], T4:8.5[s], total:30.3[s]

PARKING CONTROL METHOD AND PARKING CONTROL DEVICE

TECHNICAL FIELD

The present invention relates to a parking control method and a parking control apparatus.

BACKGROUND

With regard to this kind of technique, a parking control apparatus is known which is operated from outside of a vehicle and controls the vehicle to park (See WO2014/162753).

In WO2014/162753, however, parking schemes when an occupant (driver or passenger) is present inside the vehicle interior and when no occupant is inside the vehicle interior are not under review.

SUMMARY

A problem to be solved by the present invention is to park a vehicle with the control content in accordance with whether or not an occupant is present inside the vehicle interior.

The present invention solves the above problem by controlling a vehicle in accordance with the result of a determination whether or not an occupant is present inside the vehicle interior of the vehicle.

According to the present invention, the vehicle can be parked with the control content in accordance with whether or not an occupant is present inside the vehicle interior.

BRIEF DESCRIPTION OF THE DRAWINGS

FIG. 3 is a table illustrating an example of parameters used when calculating a target route according to one or more embodiments of the present invention;

FIG. 5 is a table illustrating an example of parameters used when calculating a target speed according to one or more embodiments of the present invention;

DETAILED DESCRIPTION

Hereinafter, one or more embodiments of the present invention will be described with reference to the drawings. In the embodiments, the present invention will be described by exemplifying an example in which the parking control apparatus according to the present invention is applied to a parking control system equipped in a vehicle. The parking control apparatus may also be applied to a portable terminal device (equipment such as a smartphone or a personal digital assistant (PDA)) capable of exchanging information with onboard devices. The parking control method according to the present invention can be used in the parking control apparatus, which will be described below.

Figure 1:
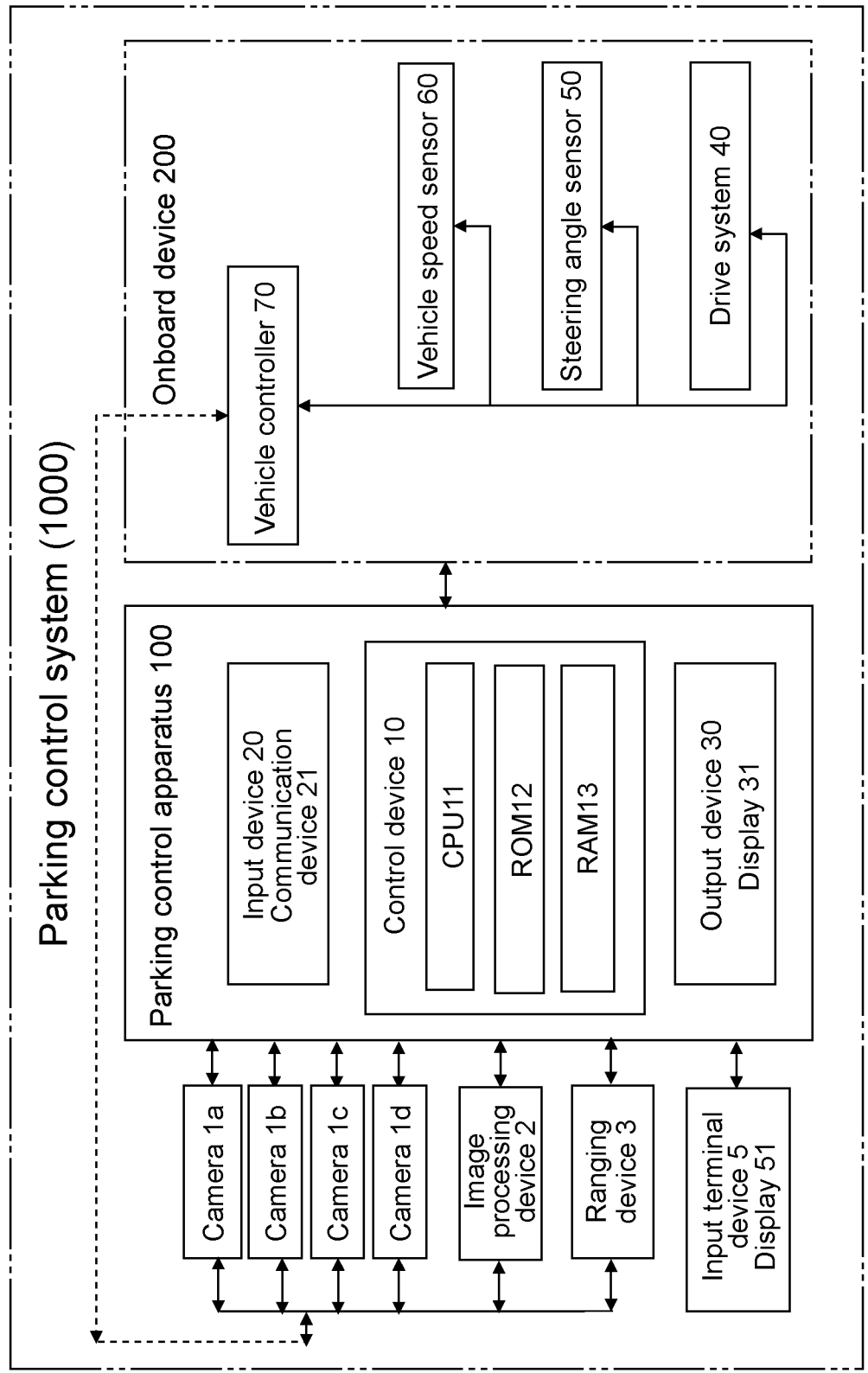
FIG. 1 is a block diagram illustrating an example of a parking control system according to one or more embodiments of the present invention.

FIG. 1 is a block diagram of a parking control system 1000 having a parking control apparatus 100 according to one or more embodiments of the present invention. The parking control system 1000 according to one or more embodiments of the present invention comprises cameras 1a to 1d, an image processing device 2, a ranging device 3, an input terminal device 5, the parking control apparatus 100, a vehicle controller 70, a drive system 40, a steering angle sensor 50, and a vehicle speed sensor 60. The parking control apparatus 100 according to one or more embodiments of the present invention controls an operation of moving (parking) the vehicle into a parking space on the basis of an operation command that is input from the input terminal device 5.

The input terminal device 5 is a portable terminal device that can be brought out to outside of the vehicle. The input terminal device 5 receives an input of an operation command for controlling the vehicle. The input terminal device 5 includes a communication device and is capable of exchanging information with the parking control apparatus 100. The input terminal device 5 transmits an operation command, which is input outside the vehicle, via a communication network to the parking control apparatus 100 and inputs the operation command to the parking control apparatus 100. The input terminal device 5 communicates with the parking control apparatus 100 using signals including a unique identification code.

The input terminal device 5 includes a display 51. The display 51 presents an input interface and various information items. When the display 51 is a touch panel-type display, it has a function of receiving an operation command.

The input terminal device 5 may be a portable device, such as a smartphone or a personal digital assistant (PDA), in which applications are installed for receiving an input of an operation command used in the parking control method according to one or more embodiments of the present invention and transmitting the operation command to the parking control apparatus 100.

The parking control apparatus 100 according to one or more embodiments of the present invention comprises a control device 10, an input device 20, and an output device 30. These components of the parking control apparatus 100 are connected to one another via a controller area network (CAN) or other in-vehicle LAN to mutually exchange information.

The input device 20 includes a communication device 21. The communication device 21 receives an operation command transmitted from the external input terminal device 5 and inputs the operation command to the input device 20. The input device 20 accepts the received operation command. The subject which inputs the operation command to the external input terminal device 5 may be a person (a user, a passenger, a driver, or a worker of a parking facility) or may also be a machine (a management device) on the parking facility side. The input device 20 receives an operation command which an occupant in the vehicle interior inputs. The input device 20 transmits the received operation command to the control device 10.

The output device 30 includes a display 31. The output device 30 notifies the driver of parking control information. The display 31 according to one or more embodiments of the present invention is a touch panel-type display having an input function and an output function. When the display 31 has an input function, the display 31 serves as the input device 20.

The control device 10 of the parking control apparatus 100 according to one or more embodiments of the present invention is a specific computer comprising a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention is a program that executes a control procedure to make a determination whether or not an occupant is present inside the vehicle interior of the vehicle and control the vehicle to park in accordance with the result of the determination. This program is executed by the control device 10 of the parking control apparatus 100 according to one or more embodiments of the present invention.

The parking control apparatus 100 according to one or more embodiments of the present invention has a remote control function of receiving an operation command from external and controlling the movement of the vehicle to park into a given parking space. During this operation, the occupant may not be present inside the vehicle interior or may also be present inside the vehicle interior. As previously described, it is also possible to input the operation command via the input device 20 in the vehicle interior.

The parking control apparatus 100 according to one or more embodiments of the present invention may be of an automatic control type in which the steering operation and the accelerator/brake operation are automatically performed. The parking control apparatus 100 may also be of a semi-automatic type in which the steering operation is automatically performed and the driver performs the accelerator/brake operation.

In the parking control program according to one or more embodiments of the present invention, the user may arbitrarily select a target parking space, or the parking control apparatus 100 or the parking facility side may automatically set a target parking space.

The control device 10 of the parking control apparatus 100 according to one or more embodiments of the present invention has functions of executing an operation command acquisition process, an occupant presence confirmation process, and a parking control process. Each of the above processes is executed by cooperation of software for implementing the process and the above-described hardware.

When executing the parking control method for controlling the vehicle to park on the basis of an operation command acquired from inside or outside of the vehicle, the control device 10 according to one or more embodiments of the present invention makes a determination whether or not an occupant is present inside the vehicle interior of the vehicle and controls the vehicle to park using a control method in accordance with the result of the determination. The control device 10 determines the presence or absence of an occupant in the vehicle interior, generates a parking route in accordance with the presence or absence of an occupant, calculates control information in accordance with the presence or absence of an occupant, and controls the vehicle to park into a given parking space on the basis of the above.

The vehicle can be parked by a method suitable for each of the request when an occupant is present inside the vehicle interior and the request when no occupant is present inside the vehicle interior because the vehicle is controlled to park in accordance with the result of determination as to whether or not an occupant is present inside the vehicle interior of the vehicle. For example, when an occupant is present inside the vehicle interior, it is required that the amount of change in the behavior of the vehicle be small and an uncomfortable feeling be not given to the occupants. On the other hand, when no occupant is present inside the vehicle interior, it is not necessary to take into account the uncomfortable feeling given to the occupants. In this case, smooth parking with a shortened parking operation time is required. The parking control device 100 executes the parking process with the control content in accordance with whether or not an occupant is present inside the vehicle interior and can therefore respond to respective requirements in both the scene in which an occupant is present and the scene in which an occupant is absent. An occupant who gets out of the vehicle is in a state of performing a parking operation for the vehicle or in a state of waiting for parking completion. In any state, the occupant is restricted in action due to parking, and it is preferred that such time be short. Particularly in specific cases, such as when the climate is hot/cold and when the weather is rain/snow/strong wind, it is preferred to smoothly complete the parking process without delay.

Figure 2:
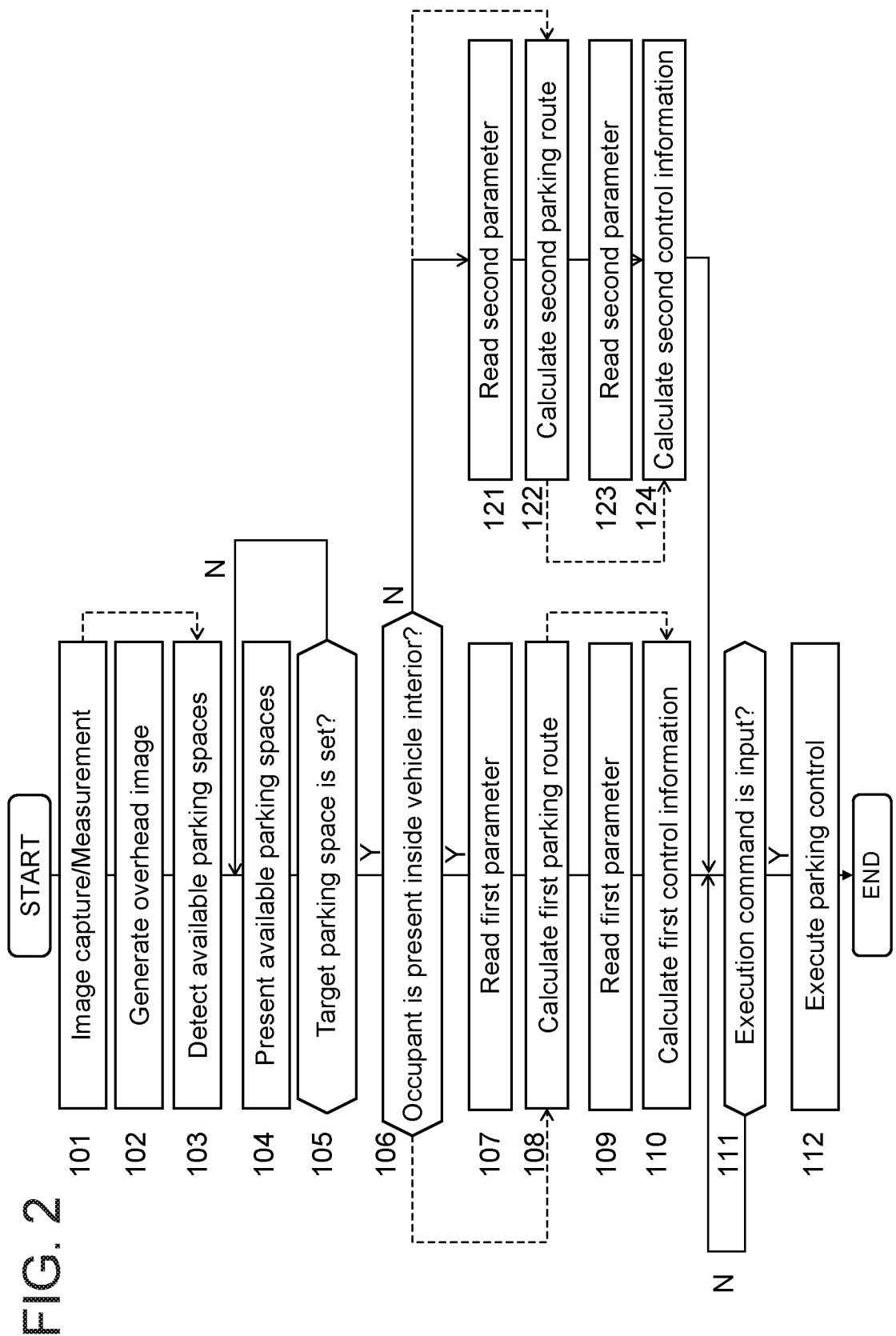
FIG. 2 is a flowchart illustrating an example of a control procedure in the parking control system according to one or more embodiments of the present invention.

FIG. 2 is a flowchart illustrating a control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of automatically moving a vehicle V to a parking space on the basis of an operation command acquired from outside of the vehicle.

In step 101, the control device 10 of the parking control apparatus 100 according to one or more embodiments of the present invention acquires images captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 101, the control device 10 also acquires ranging signals from the ranging device 3, which may be a plurality of modules attached to multiple sites of the vehicle V.

The ranging device 3 may be provided at the same position as any of the cameras 1a to 1d or may also be provided at a different position. The ranging device 3 may be a radar device, such as a millimeter-wave radar, a laser radar or an ultrasonic radar, or a sonar. The ranging device 3 detects the presence or absence of objects, positions of the objects, sizes of the objects, and distances to the objects on the basis of the received signal of the radar device. Such objects include installed subjects, pedestrians, other vehicles, and parked vehicles around the vehicle. The received signal is used to make a determination whether or not the parking space is empty (whether or not a vehicle is parked in the parking space). Obstacles may be detected using the motion stereo technique by the cameras 1a to 1d.

In step 102, the control device 10 of the parking control apparatus 100 controls the image processing device 2 to generate an overhead image. On the basis of the acquired plurality of captured images, the image processing device 2 generates an overhead image in which the surrounding state including the vehicle V and the parking space for the vehicle V to park is viewed from a virtual viewpoint above the vehicle V. Step 101 may be followed by step 103 without creating an overhead image.

In step 103, the control device 10 detects parking spaces into which parking is possible. The control device 10 detects white lines on the basis of the captured images from the cameras 1a to 1d. The white lines are boundary lines that define frames (areas) of parking spaces. The control device 10 performs edge detection on the captured images and detects the parking spaces on the basis of the luminance difference (contrast). After detecting the parking spaces, the control device 10 detects empty parking spaces in accordance with the following parking available condition using the detection data of the ranging device 3/image processing device 2. The control device 10 detects parking available spaces from among the parking spaces. The parking available spaces are parking spaces which are empty (i.e., other vehicles are not parked) and to which routes for completing the parking can be derived. The condition that a route can be derived means that a trajectory of the route can be rendered on road surface coordinates without interfering with obstacles (including parked vehicles). In practice, an accurate parking route for controlling the vehicle is derived after a target parking space is set.

In step 104, the control device 10 transmits the parking available spaces to the display 31 of the parking control device 100 or to the input terminal device 5, which is controlled to display the parking available spaces on the display 51. The parking available spaces may be superimposed on the overhead view image based on the captured images and displayed thereon.

Then, communication with the input terminal device 5 is established and an operation command acquisition process is executed. In step 105, the control device 10 determines whether or not a target parking space is input. The control device 10 determines whether or not a target parking space is input, on the basis of the operation command which is directly input to the input device 20.

The target parking space is a parking space into which the vehicle is parked by automated driving, and represents a target position in the automated driving. The target parking space is input via the input terminal device 5. For example, when the display 51 is a touch panel-type display, the user can touch the portion of a desired parking space thereby to select one target parking space. Identification information of the selected target parking space is transmitted to the parking control device 100 and input to the control device 10. When, in step 105, an operation command that specifies one parking space is input to the input terminal device 5, the parking space is set as the target parking space. Until the target parking space is input, the control flow returns to step 104 and waits for the input of an operation command. The operation command includes any one of activation of the parking control device 100, selection of a target parking space, and an execution command for the parking control.

In step 106, the presence confirmation process is executed to determine whether or not an occupant is present inside the vehicle interior. The control device 10 makes a determination whether or not an occupant is present inside the vehicle interior. The control device 10 determines the presence or absence of an occupant on the basis of the detection signal from a seating sensor provided on the seat surface of a seat. In addition or alternatively, the control device 10 may determine the presence or absence of an occupant on the basis of the fact that the user input any of the information indicating that the occupant gets out of the vehicle, the information on the start of a remote control mode, and the activation information of the parking control device 100. In addition or alternatively, the presence or absence of an occupant may be determined on the basis of detection signals from a camera, a human sensor, or the like provided in the vehicle interior.

When the operation command is acquired from outside of the vehicle interior of the vehicle, the control device 10 may determine that no occupant is present inside the vehicle interior of the vehicle. In a scene in which the operation command is input from outside of the vehicle, it is highly possible that no occupant is present inside the vehicle. The control device 10 therefore estimates that no occupant is present inside the vehicle because the operation command is input from outside of the vehicle. Depending on the management operation of the parking lot, the occupant and the operator may be different persons, so a determination can be made whether the estimation process is applied to each parking process. When the operation command is acquired from outside of the vehicle interior of the vehicle, a determination can be made that no occupant is present inside the vehicle interior of the vehicle, thereby to determine the presence or absence of an occupant without using the detection information on the vehicle side (such as the output signal from the seating sensor).

The parking route is calculated in accordance with the determination result of step 106. In one or more embodiments of the present invention, the following schemes are proposed when calculating a parking route suitable for the case in which no occupant is present inside the vehicle interior.

(1) When a determination is made that no occupant is present inside the vehicle interior of the vehicle, the control device 10 calculates a parking route having a larger curvature and/or a larger curvature change rate than when a determination is made that an occupant is present inside the vehicle interior of the vehicle. When traveling on a parking route having a large curvature or the like, it is estimated that the behavior of the vehicle is emphasized. When a determination is made that no occupant is present inside the vehicle interior of the vehicle, the behavior of the vehicle is accepted to be emphasized and a short-distance parking route is calculated. The parking route can be shortened and the parking process can thus be rapidly performed.

(2) When a determination is made that no occupant is present inside the vehicle interior of the vehicle, the control device 10 calculates a parking route in which the parking operation time required from the start of parking to the completion of parking is shorter than when a determination is made that an occupant is present inside the vehicle interior of the vehicle. When a determination is made that no occupant is present inside the vehicle interior of the vehicle, priority is given to the parking process being rapidly performed. To shorten the parking operation time, reduction in the length of route and increase in the curvature and/or curvature change rate are accepted (the behavior of the vehicle and its change amount are emphasized). The parking operation time can be shortened and the parking process can thus be rapidly performed.

(3) When a determination is made that no occupant is present inside the vehicle interior of the vehicle, the control device 10 calculates a parking route having a shorter distance than when a determination is made that an occupant is present inside the vehicle interior of the vehicle. When a determination is made that no occupant is present inside the vehicle interior of the vehicle, priority is given to the parking process being rapidly performed. To shorten the parking operation time, increase in the curvature and/or curvature change rate is accepted (the behavior of the vehicle and its change amount are emphasized). The parking operation time can be shortened and the parking process can thus be rapidly performed.

(4) The control device 10 calculates a parking route using an evaluation function in which weighting parameters are the shortness of the time required for parking and the smoothness of the behavior of the vehicle. The smoothness of the behavior of the vehicle can be evaluated by the fact that the change in the behavior of the vehicle is small (the amount of change is small). When a determination is made that no occupant is present inside the vehicle interior of the vehicle, the control device 10 sets the weighting parameter of the shortness of the time required for parking to a higher value than when a determination is made that an occupant is present inside the vehicle interior, and sets the weighting parameter of the smoothness of the behavior of the vehicle to a lower value than when a determination is made that an passenger is present inside the vehicle interior. That is, when a determination is made that no occupant is present inside the vehicle interior of the vehicle, priority is given to shortening the parking operation time at the expense of the smoothness of the behavior of the vehicle.

The control device 10 evaluates the obtained parking route using the above evaluation function. When an occupant is not present inside the vehicle interior, the control device 10 accepts the maximum curvature or the like to increase and calculates a shorter route. The evaluation scheme (evaluation function) for the parking route is not particularly limited, and any scheme known at the time of filing of this application can be appropriately applied.

In one or more embodiments of the present invention, the smoothness of behavior of the vehicle can be obtained using any one or more of the longitudinal speed jerk, lateral speed jerk, and yaw jerk. The jerk, which refers to the time derivative of acceleration, is a factor that affects the ride quality for the occupants. The shortness of the time required for parking as an evaluation item may be substituted with the shortness of the distance of a parking route. This is because the shortness of the distance of a parking route contributes to shortening the time required for parking.

When a determination is made that no occupant is present inside the vehicle interior, a relatively high weighting parameter for the shortness of the time required for parking and a relatively low weighting parameter for the smoothness of the behavior of the vehicle can be set thereby to calculate a parking route in which priority is given to shortening the parking operation time.

Referring again to step 106 of FIG. 2, when a determination is made that an occupant is present, the routine proceeds to step 107, while when a determination is made that no occupant is present, the routine proceeds to step 121.

In step 107, a first parameter for parking route calculation used when an occupant is present is read. This first parameter is used for the calculation of a first parking route in the subsequent step 108. In step 121, a second parameter for parking route calculation used when no occupant is present is read. This second parameter is used for the calculation of a second parking route in the subsequent step 122.

FIG. 3 illustrates an example of parameters used for calculating a parking route. As illustrated in FIG. 3, each parameter includes the first parameter used when an occupant is present inside the vehicle interior and the second parameter used when an occupant is absent in the vehicle interior. The second parameter is read in step 121 after the determination in step 106.

The parameters include any one or more of the length of the parking route, the maximum curvature of the parking route, the maximum curvature change rate of the parking route, and the upper limit steering speed.

With regard to the length of the route, the second parameter LR2 is set to a value shorter than the first parameter LR1. When no occupant is present inside the vehicle interior, the second parameter LR2 is used to calculate a relatively short parking route. With regard to the maximum curvature, the second parameter MR2 is set to a value larger than the first parameter MR1. When no occupant is present inside the vehicle interior, the second parameter MR2 is used to calculate a parking route having a relatively large curve. With regard to the maximum curvature change rate, the second parameter CR2 is set to a value larger than the first parameter CR1. When no occupant is present inside the vehicle interior, the second parameter CR2 is used to calculate a parking route having a relatively non-continuous curvature (the change amount is large).

In one or more embodiments of the present invention, among the parameters including the maximum curvature, the maximum curvature change rate, and the upper limit steering speed which are used for the calculation of a target route for the vehicle, any one or more of the parameters are set in the following manner. The control device 10 calculates the target route through setting the second parameter used when a determination is made that no occupant is present inside the vehicle interior to a higher value than the first parameter used when a determination is made that an occupant is present inside the vehicle interior.

The control device 10 increases the parameters including the maximum curvature, the maximum curvature change rate, and the upper limit steering speed thereby to calculate a shorter parking route. Shortening the parking route can reduce the time required for parking.

Figure 4A:
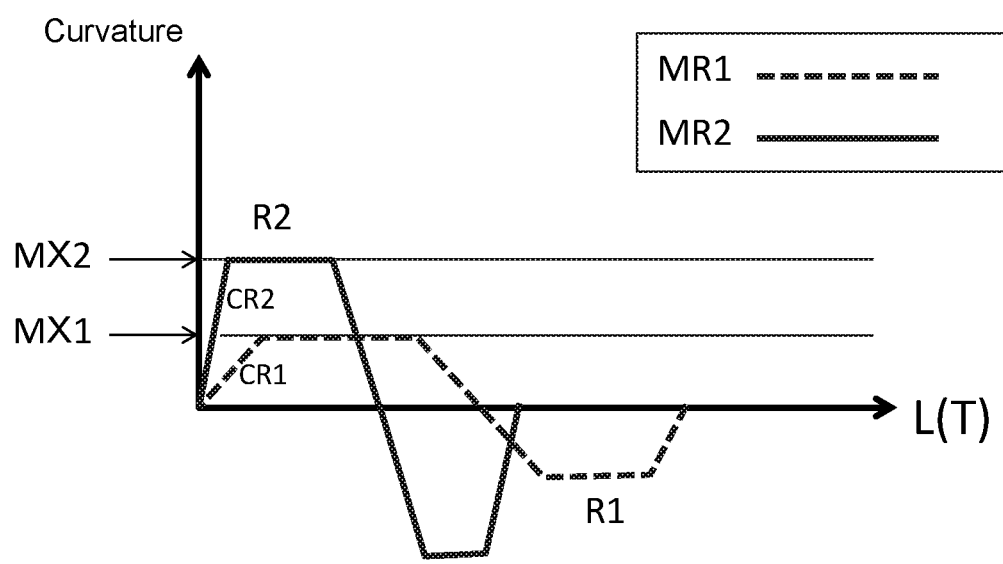
FIG. 4A is a graph illustrating the curvature of a parking route calculated using first and second parameters.

FIG. 4A illustrates the change over time in the curvature as the vehicle moves along the parking route. The broken-line graph MR1 represents the curvature of a parking route R1 calculated using the first parameter and the solid-line graph MR2 represents the curvature of a parking route R2 calculated using the second parameter. As illustrated in the figure, the maximum curvature MX2 indicated by the solid-line graph MR2 using the second parameter is a value larger than the maximum curvature MX1 indicated by the broken-line graph MR1 using the first parameter. With regard to the maximum curvature change rate represented by the inclination from the point of origin to the maximum value, the maximum curvature change rate CR2 in the solid-line graph MR2 using the second parameter is a value larger than the maximum curvature change rate represented by the broken-line graph MR1 using the first parameter.

Figure 4B:
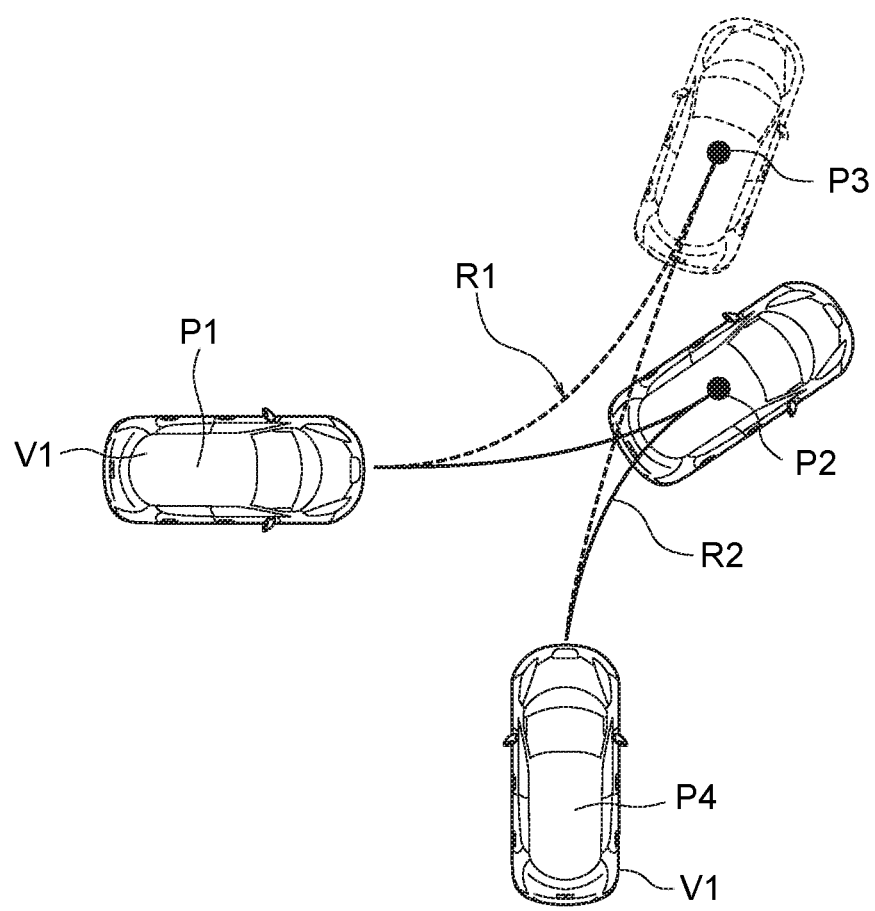
FIG. 4B is a view illustrating an example of the parking route calculated using the first and second parameters.

FIG. 4B illustrates the parking route R1 calculated using the first parameter and the parking route R2 calculated using the second parameter. As illustrated in the figure, the parking route R2 is a route having a larger curvature than that of the parking route R1, but the distance of the entire route can be shortened. The distance of the parking route is shortened and the time required for parking can thus be also shortened.

The parameters include the shortness of the time required for parking as the first weighting and the smoothness of the behavior of the vehicle as the second weighting. With regard to the shortness of the parking operation time as the first weighting, the second parameter TVR2 is set to a value larger than the first parameter TVR1. When no occupant is present inside the vehicle interior, the second parameter TVR2 is used to calculate the parking route with a shorter parking operation time. With regard to the smoothness of the behavior of the vehicle as the second weighting, the second parameter SR2 is set to a value smaller than the first parameter SR1. When no occupant is present inside the vehicle interior, the second parameter SR2 is used to calculate the parking route in which the smoothness of the behavior of the vehicle is impaired (the maximum curvature and the maximum curvature change rate are large).

The control device 10 calculates control information in accordance with the determination result of step 106.

In one or more embodiments of the present invention, the following schemes are proposed as those for calculating the control information suitable for the case in which no occupant is present inside the vehicle interior.

(1) When a determination is made that no occupant is present inside the vehicle interior, the control device 10 calculates the control information to emphasize the behavior of the vehicle than when a determination is made that an occupant is present inside the vehicle interior. The control device 10 controls the vehicle to move along the parking route in accordance with the control information. When a determination is made that no occupant is present inside the vehicle interior, the behavior of the vehicle is accepted to be emphasized and priority is given to the parking process being rapidly performed. While the behavior of the vehicle is emphasized (the acceleration, deceleration, yaw rate, steering amount, steering speed, lateral acceleration, and jerk become large), the vehicle can more rapidly move to shorten the parking operation time.

(2) When a determination is made that no occupant is present inside the vehicle interior, the control device 10 calculates the control information to shorten the parking operation time required from the start of parking to the completion of parking than when a determination is made that an occupant is present inside the vehicle interior. When a determination is made that no occupant is present inside the vehicle interior, priority is given to the parking process being rapidly performed. The parking operation time is shortened while accepting increase in the values corresponding to the behavior of the vehicle, such as the speed, acceleration, deceleration, yaw rate, steering amount, steering speed, lateral acceleration, and jerk.

(3) When a determination is made that no occupant is present inside the vehicle interior, the control device 10 increases the speed of the vehicle than when a determination is made that an occupant is present inside the vehicle interior. When a determination is made that no occupant is present inside the vehicle interior, priority is given to the parking process being rapidly performed. The vehicle speed can be set high thereby to shorten the parking operation time.

(4) The control device 10 uses the evaluation function, in which the weighting parameters are the shortness of the time required for parking and the smoothness of the behavior of the vehicle, for the calculation process for the control information. When a determination is made that no occupant is present inside the vehicle interior, the control device 10 sets the weighting parameter of the shortness of the time required for parking to a higher value than when a determination is made that an occupant is present inside the vehicle interior, and sets the weighting parameter of the smoothness of the behavior of the vehicle to a lower value than when a determination is made that an passenger is present inside the vehicle interior. This can shorten the parking operation time when a determination is made that no occupant is present inside the vehicle interior. In addition, when a determination is made that an occupant is present inside the vehicle interior, the behavior of the vehicle can be more smoothened, thus suppressing the uncomfortable feeling given to the occupant.

(5) When a determination is made that no occupant is present inside the vehicle interior, the control device 10 sets the parking completion point, at which the vehicle is controlled to stop, to a position at which the vehicle comes into contact with a curbstone. When a tire of the vehicle comes into contact with a curbstone, the contact force acts to move the vehicle back and forth. This movement exhibits a certain pattern depending on the speed. The control device 10 monitors the movement of the vehicle and determines that a tire of the vehicle comes into contact with a curbstone when detecting that pattern. This timing is detected as the timing when the vehicle reaches the parking completion point. It is thus possible to accurately determine that the vehicle reaches the parking completion point by detecting the contact of the tire of the vehicle with the curbstone on the basis of the change in the behavior of the vehicle.

Collision of a tire with a curbstone shakes the vehicle and gives an uncomfortable feeling to the occupants. When an occupant is present inside the vehicle interior, the control device 10 provides a predetermined margin from the curbstone to stop the vehicle before the curbstone (on the upstream side of the curbstone). This is to prevent an uncomfortable feeling given to the occupants. On the other hand, when no occupant is present inside the vehicle interior, priority is given to shortening the parking operation time rather than the ride quality for the occupants. The parking operation time can be shortened by setting the parking completion point, at which the vehicle is controlled to stop, to a position at which the vehicle comes into contact with a curbstone.

The control device 10 evaluates the calculated control information using the evaluation function. Evaluation items in the evaluation function are the shortness of the time required for parking and the smoothness of the behavior of the vehicle. The control information is evaluated on the basis of the sum of these evaluation items. Weighting is applied to each evaluation item to optimize the evaluation. The evaluation scheme (evaluation function) for the control information such as the target vehicle speed is not particularly limited, and any scheme known at the time of filing of this application can be appropriately applied.

In one or more embodiments of the present invention, the control device 10 calculates the smoothness of behavior of the vehicle using any one or more of the longitudinal speed jerk, lateral speed jerk, and yaw jerk. The jerk, which refers to the time derivative of acceleration, is a factor that affects the ride quality for the occupants. The smoothness of the behavior of the vehicle can be positioned as a value relating to the ride quality for the occupants. When no occupant is present inside the vehicle interior, the acceptable level of the ride quality for the occupants can be set low to shorten the parking operation time. The shortness of the time required for parking as an evaluation item may be substituted with the highness of the vehicle speed when parking. This is because the highness of the vehicle speed when parking contributes to shortening the time required for parking.

The control information refers to a control command for the vehicle speed or the like obtained using parameters such as the acceleration, yaw rate, steering amount, steering speed, and lateral acceleration for controlling the behavior of the vehicle.

When a determination is made that no occupant is present inside the vehicle interior, a relatively high weighting parameter for the shortness of the time required for parking and a relatively low weighting parameter for the smoothness of the behavior of the vehicle can be set thereby to calculate the control information in which priority is given to shortening the parking operation time.

For any one or more of parameters among the parameters relating to the behavior of the vehicle which are used for calculation of the target speed of the vehicle and include the upper limit acceleration, upper limit yaw rate, upper limit lateral acceleration, upper limit steering speed, upper limit acceleration jerk, upper limit deceleration, and upper limit deceleration jerk, the control device 10 sets the second parameter, which is used when a determination is made that no occupant is present inside the vehicle interior, to a higher value than the first value which is used when a determination is made that an occupant is present inside the vehicle interior, and calculates the target speed when parking.

The smoothness of the behavior of the vehicle is obtained using any one or more of the longitudinal speed jerk, lateral speed jerk, and yaw jerk.

For the parameters relating to the behavior of the vehicle, the second parameter when no occupant is present can be set higher than the first parameter when an occupant is present, thereby to shorten the time required for parking while accepting the behavior of the vehicle to be emphasized.

Referring again to FIG. 2, the processing procedure will be described. When a determination is made that an occupant is present inside the vehicle interior, the control device 10 reads the first parameter for the control information calculation in step 109. In step 110, the control device 10 calculates the first control information using the first parameter. The first control information is information for controlling the behavior of the vehicle when moving the vehicle to the target parking space.

When a determination is made that no occupant is present inside the vehicle interior, the control device 10 reads the second parameter for the control information calculation in step 123. In step 124, the control device 10 calculates the second control information using the second parameter. The second control information is information for controlling the behavior of the vehicle when moving the vehicle to the target parking space.

In the parking control method according to one or more embodiments of the present invention, both the above-described calculation process for the parking route using the first parameter and the calculation process for the control information using the first parameter may be executed, or only one of the calculation processes may also be executed. When a determination is made in step 106 that an occupant is present inside the vehicle interior, the first parameter for the parking route calculation is read in step 107 to calculate in step 108 the first parking route and then the routine may proceed to step 110 in which the control information is calculated using a default parameter to move the vehicle along the first parking route. When a determination is made in step 106 that no occupant is present inside the vehicle interior, the second parameter for the parking route calculation is read in step 121 to calculate in step 122 the second parking route and then the routine may proceed to step 124 in which the control information is calculated using a default parameter to move the vehicle along the second parking route. The action and effect of the present invention can be obtained merely by shortening the second parking route.

When a determination is made in step 106 that an occupant is present inside the vehicle interior, the first parking route may be calculated in step 108 using a default parameter without reading the first parameter for the parking route calculation in step 107 and then the routine may proceed to step 109 to read the first parameter for the control information calculation. In step 110, the control information may be calculated using the first parameter to move the vehicle along the first parking route. When a determination is made in step 106 that no occupant is present inside the vehicle interior, the second parking route may be calculated in step 122 using a default parameter without reading the second parameter for the parking route calculation in step 121 and then the routine may proceed to step 124 in which the control information is calculated using the second parameter to move the vehicle along the second parking route. The action and effect of the present invention can be obtained merely by emphasizing the behavior of the vehicle.

FIG. 5 illustrates an example of parameters used for the control information calculation when parking. As illustrated in FIG. 5, each parameter includes the first parameter used when an occupant is present inside the vehicle interior and the second parameter used when an occupant is absent in the vehicle interior. The second parameter is read in step 123 after the determination in step 106.

The parameters include index values that dominate the behavior of the vehicle. The index values include any one or more of the speed, acceleration, deceleration, yaw rate, lateral acceleration, steering amount, steering speed, lateral acceleration, and jerk.

With regard to the upper limit acceleration, the second parameter AR2 is set to a value larger than the first parameter AR1. When no occupant is present inside the vehicle interior, the second parameter AR2 is used to calculate the control information with which the behavior of the vehicle is relatively emphasized. With regard to the upper limit deceleration, the second parameter DR2 is set to a value larger than the first parameter DR1. When no occupant is present inside the vehicle interior, the second parameter DR2 is used to calculate the control information with which the behavior of the vehicle is relatively emphasized. The same applies to the upper limit yaw rate (YR1, YR2), the upper limit lateral acceleration (HAR1, HAR2), the upper limit steering speed (SRR1, SRR2), and the upper limit jerk (STJR1, STJR2) as illustrated in the figure. When no occupant is present inside the vehicle interior, the second parameter (YR2, HAR2, SRR2, STJR2) is used to calculate the control information with which the behavior of the vehicle is relatively emphasized. Parking can be completed in a short time because the emphasized behavior of the vehicle is accepted.

The parameters include a deceleration time from when deceleration of the vehicle is started to when the vehicle stops. This deceleration time is used for calculating the target speed when controlling the vehicle to stop. For the parameters relating to the deceleration time from when deceleration of the vehicle is started to when the vehicle stops, the control device 10 sets the second deceleration time STRR2 when a determination is made that no occupant is present inside the vehicle interior to a shorter value than the first deceleration time STRR1 when a determination is made that an occupant is present inside the vehicle interior, and calculates the target speed when parking. The control device 10 controls the vehicle on the basis of the target speed. When an occupant is absent in the vehicle, the deceleration time from when deceleration of the vehicle is started to when the vehicle stops is set shorter to obtain the target speed, and the parking operation time can therefore be shortened. The deceleration time can also be expressed as a deceleration distance.

Figure 6:
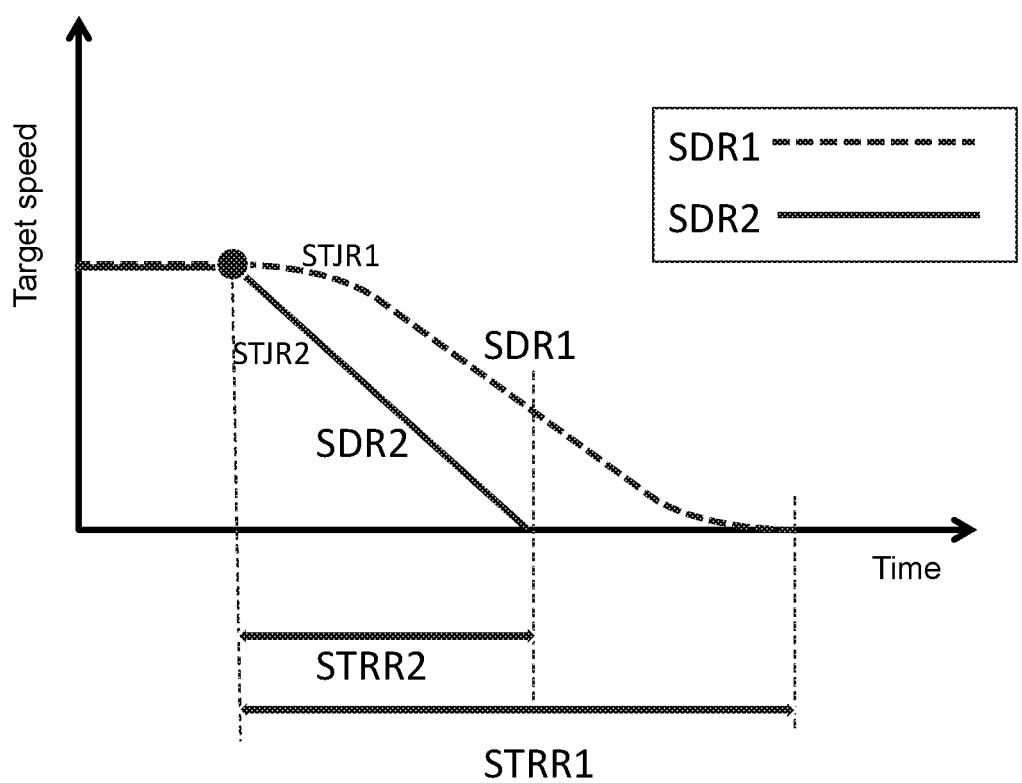
FIG. 6 is a graph illustrating the change in the target speed when decelerating.

FIG. 6 illustrates the change over time in the target speed of the vehicle. The broken-line graph SDR1 represents the change over time in the target speed (control information) calculated using the first parameter while the solid-line graph SDR2 represents the change over time in the target speed (control information) calculated using the second parameter. Comparison is made during the time from the start of deceleration to the completion of parking (the time until the target speed comes to zero). As illustrated in the figure, the time until the completion of parking indicated by the solid-line graph SDR2 using the second parameter is STRR2, and the time until the completion of parking indicated by the broken-line graph SDR1 using the first parameter is STRR1.

With regard to the maximum deceleration represented by the inclination at the start of deceleration, the maximum deceleration STJR2 in the solid-line graph SDR2 using the second parameter is a value larger than the maximum deceleration STJR1 indicated by the broken-line graph SDR1 using the first parameter. With regard to the behavior of the vehicle, it is possible to accept the behavior (deceleration) of the vehicle to be emphasized by using the second parameter larger than the first parameter. This can shorten the time from the deceleration to the completion of parking.

The parameters include a stop position margin to the parking completion point for the vehicle. When a determination is made that an occupant is present inside the vehicle interior, the control device 10 controls the vehicle to stop on the upstream side of the parking completion point by a first stop position margin MR1. When a determination is made that no occupant is present inside the vehicle interior, the control device 10 controls the vehicle to stop on the upstream side or downstream side of the parking completion point by a second stop position margin MR2. The second stop position margin MR2 is a value smaller than the first stop position margin MR1. The parking completion point is, for example, the position of a curbstone. When the stop position margin is set to a small value on the upstream side of the parking completion point, the possibility that the vehicle comes into contact with a curbstone is high. When the stop position margin is set to zero, the vehicle stops at the parking completion point, that is, a position at which the vehicle comes into contact with a curbstone. When the stop position margin is set on the downstream side of the parking completion point, the vehicle comes into contact with a curbstone. In other words, it is highly possible to give an uncomfortable feeling to the occupants. When a determination is made that no occupant is present inside the vehicle interior, the deceleration time to the parking completion point is set to a short time or the vehicle is controlled to stop when it comes into contact with a curbstone, while accepting the possibility that the vehicle may come into contact with a curbstone.

Figure 7:
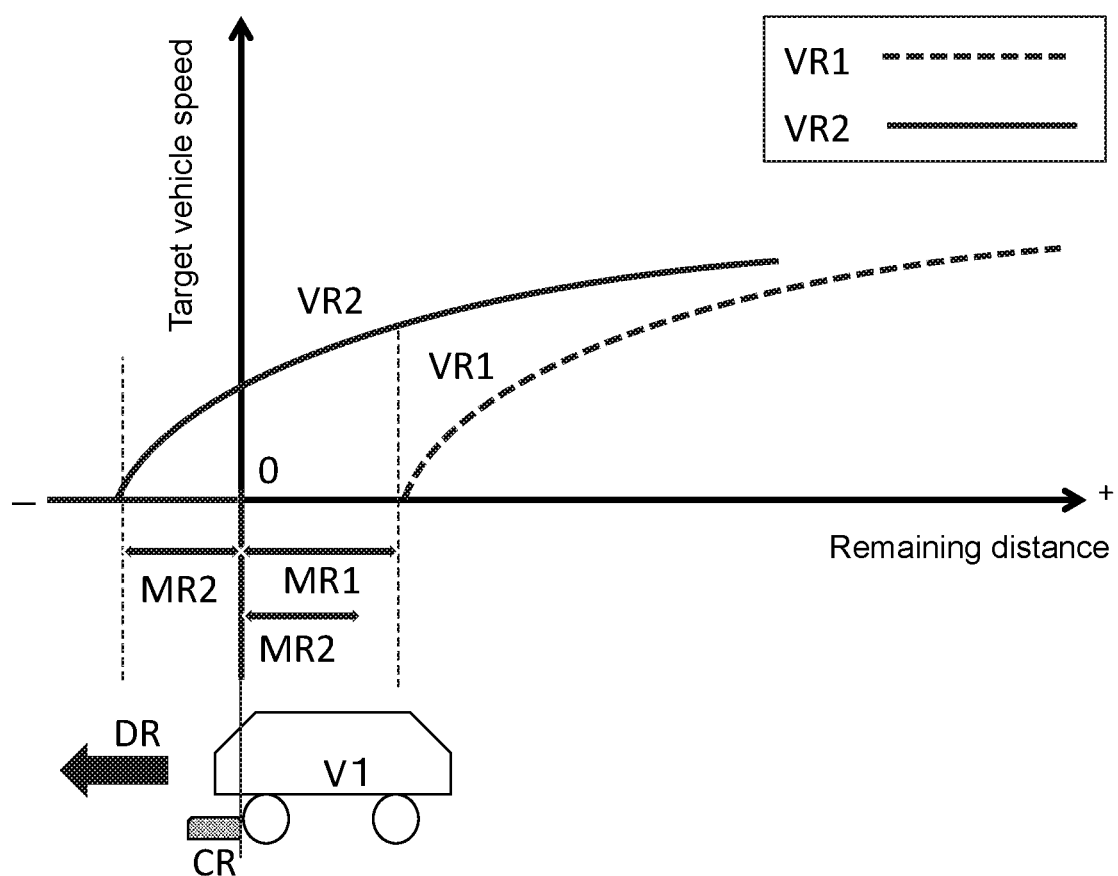
FIG. 7 is a diagram illustrating a setting example of a distance margin to a parking target point.

FIG. 7 illustrates the relationship between the distance to the parking completion point and the target vehicle speed. The position of zero distance is the parking completion point, which is the position of a curbstone CR. The first stop position margin MR1 is set on the upstream side (+x) with respect to a traveling direction DR of the vehicle. In this case, the second stop position margin MR2 is shorter than the first stop position margin MR1. The second stop position margin MR2 may be set on the downstream side (−x) with respect to the traveling direction DR of the vehicle.

Thus, by controlling the vehicle to stop at a point in the vicinity of the upstream of the parking completion point such as a curbstone or at a point on the downstream side of the parking completion point, the parking operation time can be shortened while accepting the vehicle to come into contact with a curbstone.

The parameters include the shortness of the time required for parking as the first weighting and the smoothness of the behavior of the vehicle as the second weighting. With regard to the shortness of the parking operation time as the first weighting, the second parameter TVR2 is set to a value larger than the first parameter TVR1. When no occupant is present inside the vehicle interior, the second parameter TVR2 is used to calculate the control information with which a shorter parking operation time is achieved. With regard to the smoothness of the behavior of the vehicle as the second weighting, the second parameter SR2 is set to a value smaller than the first parameter SR1. When no occupant is present inside the vehicle interior, the second parameter SR2 is used to calculate the control information with which the smoothness of the behavior of the vehicle is impaired.

Referring again to FIG. 2, when an occupant is present inside the vehicle interior, in step 110, the control device 10 uses the acquired first parameter to calculate the first control information when controlling the vehicle to move to the target parking space. On the other hand, when no occupant is present inside the room, in step 124, the control device 10 uses the acquired second parameter to calculate the second control information when controlling the vehicle to move to the target parking space.

When an execution command for the parking control process is input in step 111, the routine proceeds to step 112 in which the parking control apparatus 100 according to one or more embodiments of the present invention executes the parking control process.

The parking control apparatus 100 according to one or more embodiments of the present invention controls the operation of the drive system 40 via the vehicle controller 30 so that the vehicle V1 moves along the parking route in accordance with the control information.

The parking control apparatus 100 calculates command signals to the drive system 40 of the vehicle V1, such as an EPS motor, while feeding back the output value of the steering angle sensor 50 of the steering apparatus so that the travel trajectory of the vehicle V1 coincides with the calculated parking route, and transmits the command signals to the drive system 40 or to the vehicle controller 70 which controls the drive system 40.

The parking control apparatus 100 according to one or more embodiments of the present invention includes a parking control unit. The parking control unit acquires shift range information from an AT/CVT control unit, wheel speed information from an ABS control unit, steering angle information from a steering angle control unit, engine speed information from an ECM, and other necessary information. On the basis thereof, the parking control unit calculates and outputs instruction information on the automated steering to the EPS control unit, instruction information such as warning to a meter control unit, etc. The control device 10 acquires information items, which are acquired by the steering angle sensor 50 of the steering apparatus of the vehicle V1 and the vehicle speed sensor 60 and other sensors of the vehicle, via the vehicle controller 70.

The drive system 40 according to one or more embodiments of the present invention controls the vehicle V1 to move (travel) from the current position to the target parking space by driving based on the control command signals acquired from the parking control apparatus 100. The steering apparatus according to one or more embodiments of the present invention is a drive mechanism that moves the vehicle V1 in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V1 to the target parking space. The control content and operation scheme for parking of the vehicle V1 are not particularly limited, and any scheme known at the time of filing of this application can be appropriately applied.

When the parking control apparatus 100 according to one or more embodiments of the present invention controls the vehicle V1 to move to the target parking space along the route calculated based on the position P4 of the vehicle V1 and the position of the target parking space, the accelerator and the brake are automatically controlled on the basis of the specified control vehicle speed (set vehicle speed), and the operation of the steering apparatus is also automatically controlled in accordance with the vehicle speed. That is, during the parking control according to one or more embodiments of the present invention, the steering operation and the accelerator/brake operation are automatically performed. Furthermore, the parking control apparatus 100 according to one or more embodiments of the present invention is also applicable to manual parking in which the driver performs the operation of the accelerator, brake, and steering.

The parking control apparatus 100 according to one or more embodiments of the present invention is capable of a remote control parking process in which the vehicle V1 with no driver is parked by transmitting a setting command for the target parking space, a parking process start command, a parking process suspension/cancellation command, etc. to the vehicle V1 from the outside.

Figure 8:
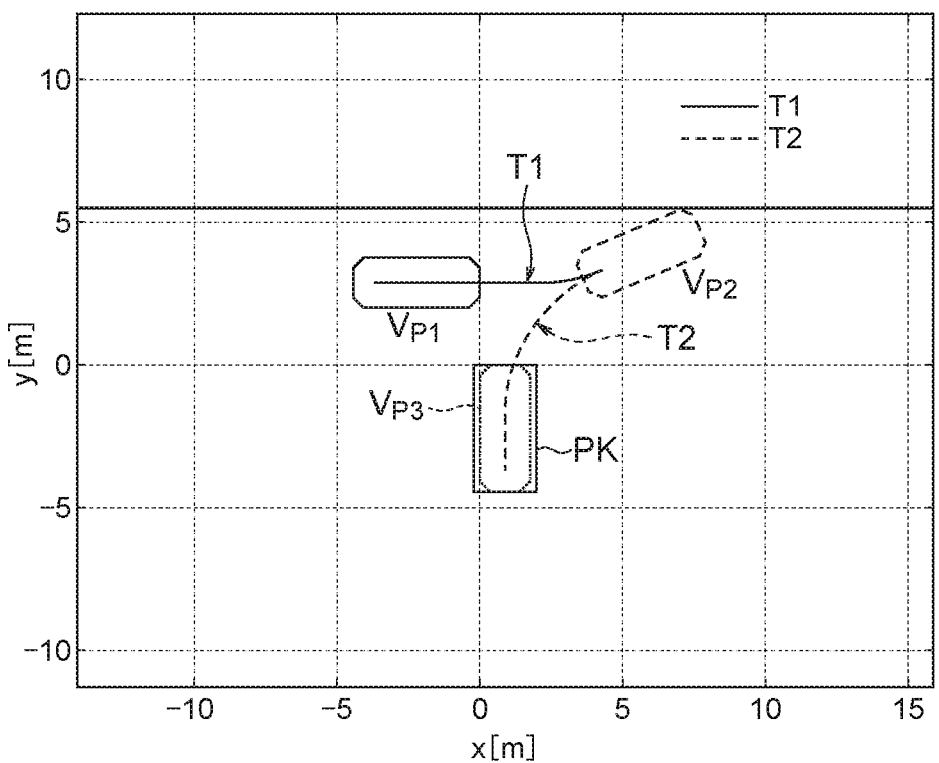
FIG. 8 is a diagram for describing conditions of a first simulation according to one or more embodiments of the present invention.
Figure 9A:
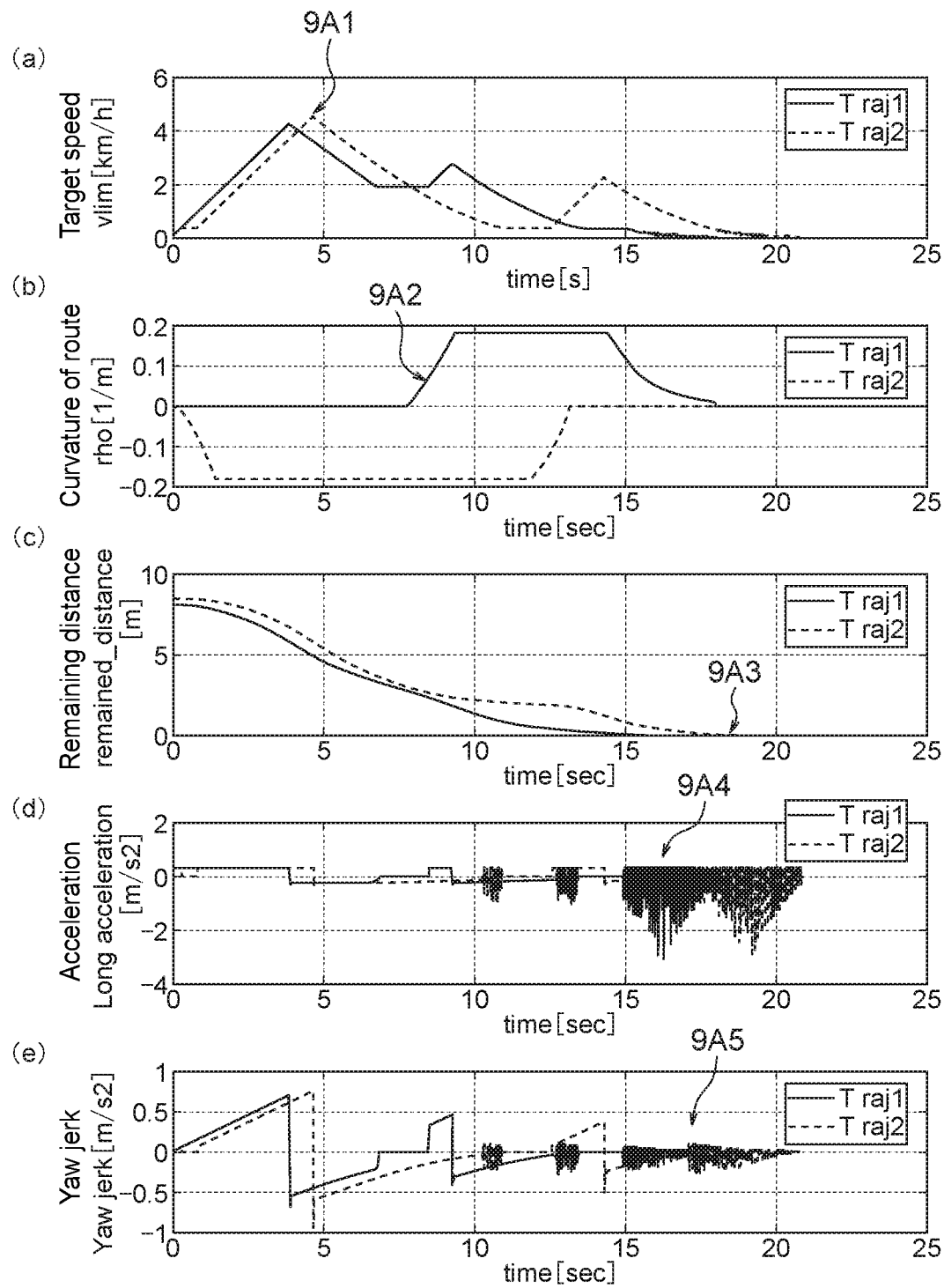
FIG. 9A is a set of graphs (a) to (e) each illustrating the relationship between a first parameter and a parking operation time in one or more embodiments of the present invention.
Figure 9B:
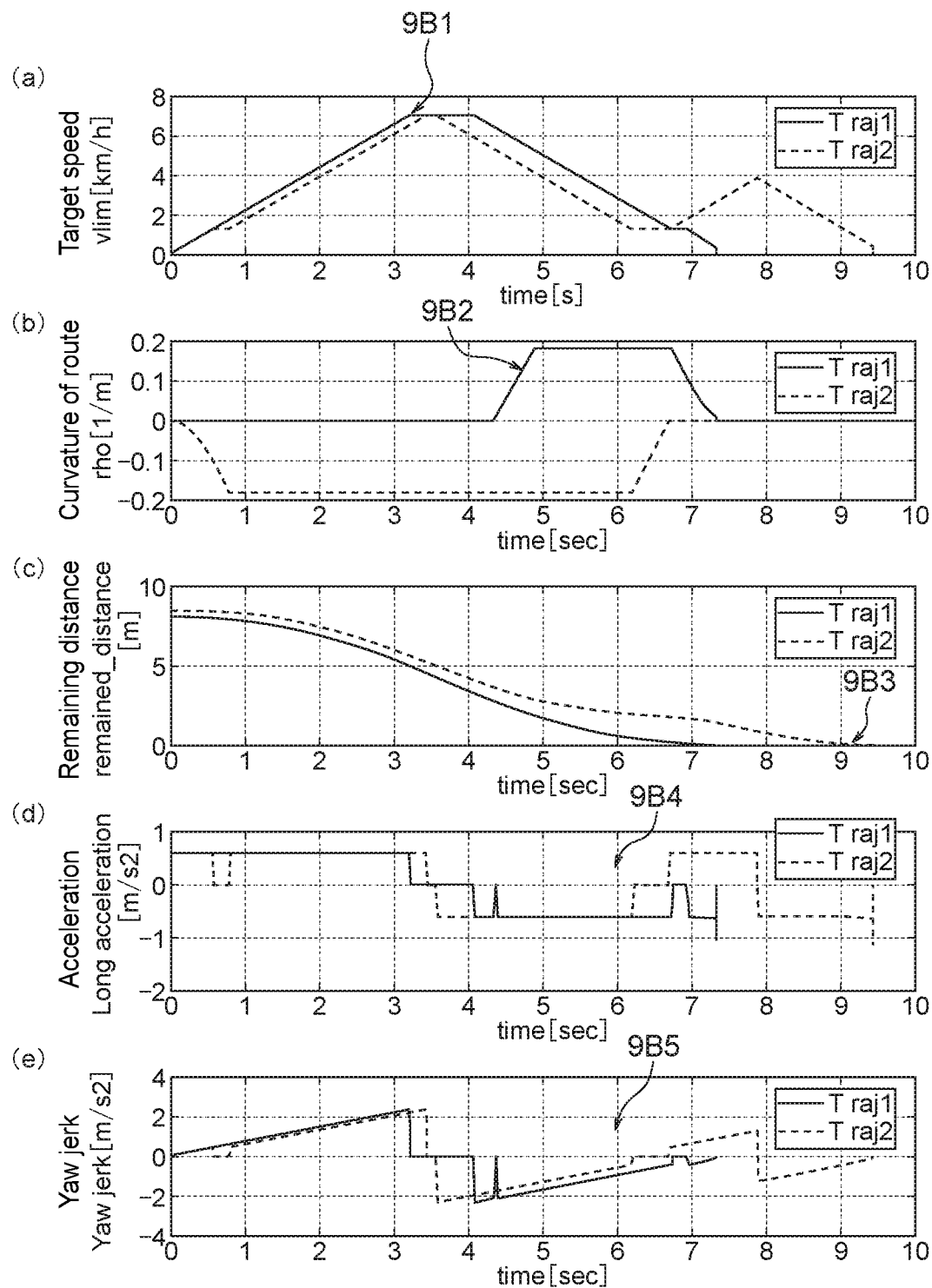
FIG. 9B is a set of graphs (a) to (e) each illustrating the relationship between a second parameter and a parking operation time in one or more embodiments of the present invention.
Figure 10:
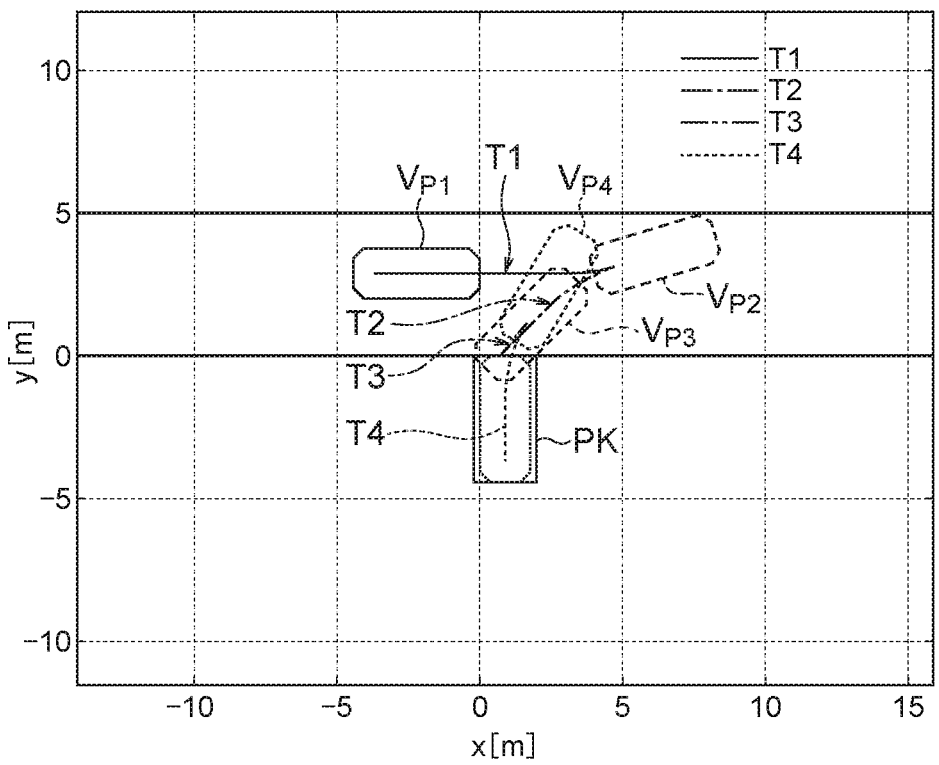
FIG. 10 is a diagram for describing conditions of a second simulation according to one or more embodiments of the present invention.
Figure 11A:
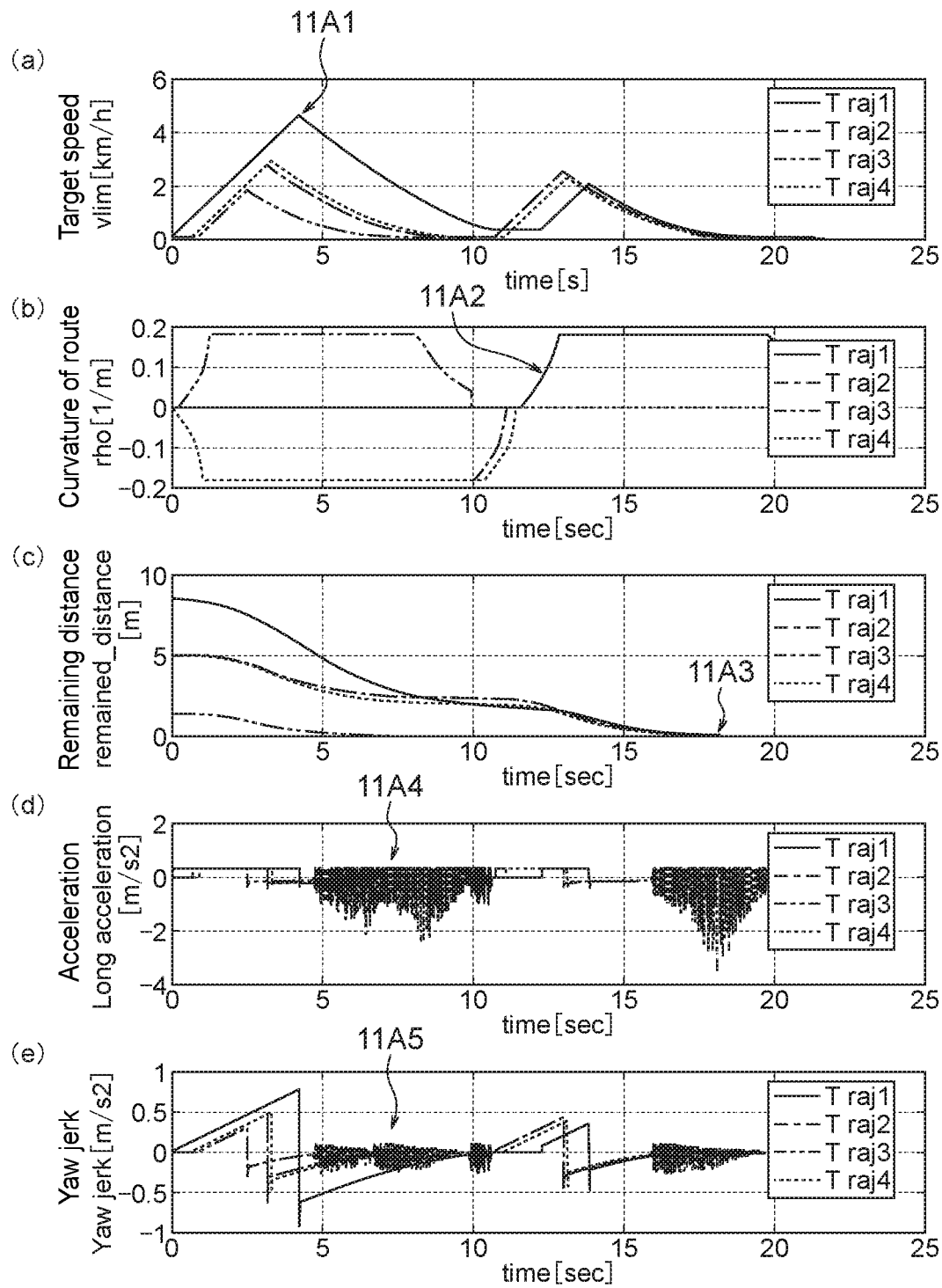
FIG. 11A is a set of graphs (a) to (e) each illustrating the relationship between a first parameter and a parking operation time in one or more embodiments of the present invention.
Figure 11B:
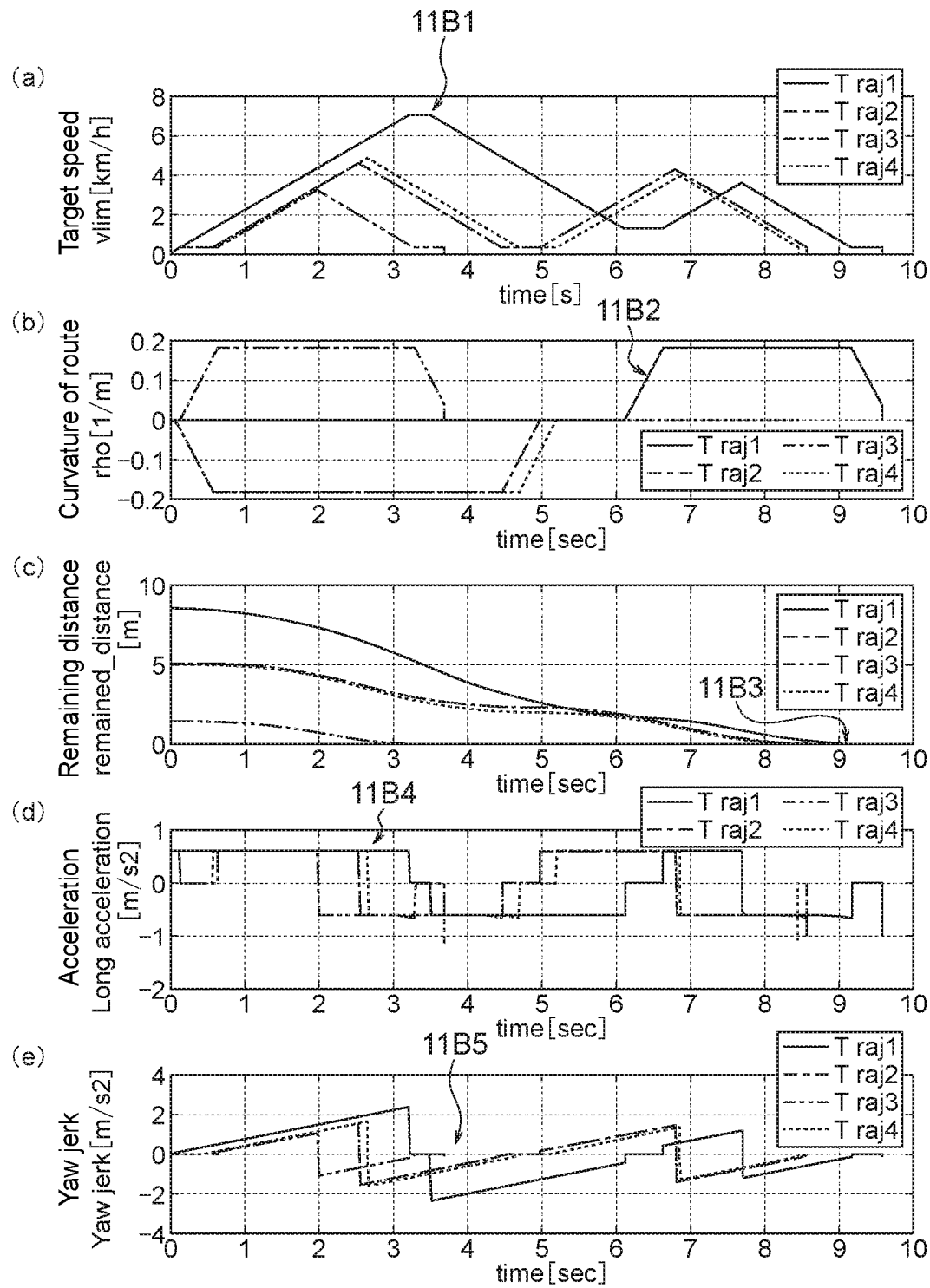
FIG. 11B is a set of graphs (a) to (e) each illustrating the relationship between a second parameter and a parking operation time in one or more embodiments of the present invention.

Simulation was conducted to confirm the effects of one or more embodiments of the present invention. In this simulation, profiles of the behavior (such as speed) of the vehicle V1 were obtained using different parameters in accordance with the determination result as to whether or not an occupant is present inside the vehicle interior. FIG. 8, FIG. 9A, and FIG. 9B illustrate the profiles of the behavior (such as speed) of the vehicle V1 in a parking route with a single turn for parking, and FIG. 10, FIG. 11A, and FIG. 11B illustrate the profiles of the behavior (such as speed) of the vehicle V1 in a parking route with multiple turns for parking.

FIG. 8 is a diagram for describing conditions of a first simulation. The vehicle as a model starts from a first position VP1 and moves along a first route T1 to a second position VP2. The vehicle then turns back at the second position VP2 and moves along a second route T2 to a third position VP3. The third position VP3 is a target position PK at which the vehicle V1 stops. Simulation was conducted under the same conditions when an occupant is present inside the vehicle interior and when no occupant is present inside the vehicle interior. In the simulation, the conditions are set as the lane width: lane width [m], the parking space width: spot width [m], the vehicle width: lat. [m], the parking start angle: init. [deg.], and the parking completion angle: fin [deg.]. These conditions determine acceptable routes and operations. An optimum route (a route with which parking can be performed in the minimum time or a route with which the behavior is suppressed) is generated from among the acceptable routes and operations, and the simulation is executed.

FIG. 9A illustrates changes over time in the target speed (a), the curvature of route (b), the remaining distance (c), the acceleration (d), and the yaw jerk (e) when an occupants is present inside the vehicle interior. FIG. 9B illustrates changes over time in the target speed (a), the curvature of route (b), the remaining distance (c), the acceleration (d), and the yaw jerk (e) when no occupants is present inside the vehicle interior. In both FIG. 9A and FIG. 9B, Traj1 in the figure represents a profile for the first route T1 and Traj2 represents a profile for the second route T2.

Comparison will be made between the profiles of FIG. 9A and FIG. 9B.

(1) The maximum value 9B1 of the target speed of the profile when no occupant is present as illustrated in FIG. 9B(*a*) is controlled to be higher than the maximum value 9A1 of the target speed of the profile when an occupant is present as illustrated in FIG. 9A(*a*). When no occupant is present, priority is given to rapidly executing the parking rather than smoothly moving the vehicle, and the parking operation time can thus be shortened.

(2) The curvature change rate 9B2 of the profile when no occupant is present as illustrated in FIG. 9B(*b*) is controlled to a higher value than the curvature change rate 9A2 of the profile when an occupant is present as illustrated in FIG. 9A(*b*). When no occupant is present, priority is given to rapidly executing the parking rather than smoothly moving the vehicle, and the parking operation time can thus be shortened.

(3) The time 9B3 until the remaining distance of the profile when no occupant is present comes to zero (parking completion) as illustrated in FIG. 9B(*c*) is controlled to be shorter than the time 9A3 until the remaining distance of the profile when an occupant is present comes to zero (parking completion) as illustrated in FIG. 9A(*c*). When no occupant is present, priority is given to rapidly executing the parking rather than smoothly moving the vehicle, and the parking operation time can thus be shortened.

(4) The variation width of the acceleration 9B4 of the profile when no occupant is present as illustrated in FIG. 9B(*d*) is controlled to be larger than the variation width of the acceleration 9A4 of the profile when an occupant is present as illustrated in FIG. 9A(*d*). When no occupant is present, priority is given to rapidly executing the parking rather than smoothly moving the vehicle, and the parking operation time can thus be shortened.

(5) The maximum value/variation width 9B5 of the yaw jerk of the profile when no occupant is present as illustrated in FIG. 9B(e) is controlled to be larger than the maximum value/variation width 9A5 of the yaw jerk of the profile when an occupant is present as illustrated in FIG. 9A(e). When no occupant is present, priority is given to rapidly executing the parking rather than smoothly moving the vehicle, and the parking operation time can thus be shortened.

FIG. 10 is a diagram for describing conditions of a second simulation. The second simulation is different from the first simulation in the number of turns for parking.

As illustrated in FIG. 10, the vehicle as a model starts from a first position VP1 and moves along a first route T1 to a second position VP2. The vehicle then turns back at the second position VP2 and moves back along a second route T2 to a third position VP3. The vehicle then moves forward from the third position VP3 along a third route T3 and moves to a fourth position VP4.

The fourth position VP4 is a target position PK at which the vehicle V1 stops. Simulation was conducted under the same conditions when an occupant is present inside the vehicle and when no occupant is present inside the vehicle. In the simulation, the conditions are set as the lane width: lane width [m], the parking space width: spot width [m], the vehicle width: lat. [m], the parking start angle: init. [deg.], and the parking completion angle: fin. [deg.]. These conditions determine acceptable routes and operations. An optimum route (a route with which parking can be performed in the minimum time or a route with which the behavior is suppressed) is generated from among the acceptable routes and operations, and the simulation is executed.

FIG. 11A illustrates changes over time in the target speed (a), the curvature of route (b), the remaining distance (c), the acceleration (d), and the yaw jerk (e) when an occupants is present inside the vehicle interior. FIG. 11B illustrates changes over time in the target speed (a), the curvature of route (b), the remaining distance (c), the acceleration (d), and the yaw jerk (e) when no occupants is present inside the vehicle interior. In both FIG. 11A and FIG. 11B, Traj1 in the figure represents a profile for the first route T1, Traj2 represents a profile for the second route T2, Traj3 in the figure represents a profile for the third route T3, and Traj4 represents a profile for the fourth route T4.

Comparison will be made between the profiles of FIG. 11A and FIG. 11B.

(1) The maximum value 11B1 of the target speed of the profile when no occupant is present as illustrated in FIG. 11B(a) is controlled to be higher than the maximum value 11A1 of the target speed of the profile when an occupant is present as illustrated in FIG. 11A(a). When no occupant is present, priority is given to rapidly executing the parking rather than smoothly moving the vehicle, and the parking operation time can thus be shortened.

(2) The curvature change rate 11B2 of the profile when no occupant is present as illustrated in FIG. 11B(b) is controlled to a higher value than the curvature change rate 11A2 of the profile when an occupant is present as illustrated in FIG. 11A(b). When no occupant is present, priority is given to rapidly executing the parking rather than smoothly moving the vehicle, and the parking operation time can thus be shortened.

(3) The time 11B3 until the remaining distance of the profile when no occupant is present comes to zero (parking completion) as illustrated in FIG. 11B(c) is controlled to be shorter than the time 11A3 until the remaining distance of the profile when an occupant is present comes to zero (parking completion) as illustrated in FIG. 11A(c). When no occupant is present, priority is given to rapidly executing the parking rather than smoothly moving the vehicle, and the parking operation time can thus be shortened.

(4) The variation width of the acceleration 11B4 of the profile when no occupant is present as illustrated in FIG. 11B(d) is controlled to be larger than the variation width of the acceleration 11A4 of the profile when an occupant is present as illustrated in FIG. 11A(d). When no occupant is present, priority is given to rapidly executing the parking rather than smoothly moving the vehicle, and the parking operation time can thus be shortened.

(5) The maximum value/variation width 11B5 of the yaw jerk of the profile when no occupant is present as illustrated in FIG. 11B(e) is controlled to be larger than the maximum value/variation width 11A5 of the yaw jerk of the profile when an occupant is present as illustrated in FIG. 11A(e). When no occupant is present, priority is given to rapidly executing the parking rather than smoothly moving the vehicle, and the parking operation time can thus be shortened.

The parking control method according to one or more embodiments of the present invention is used in the parking control apparatus as the above and therefore has the following effects. The parking control apparatus 100 according to one or more embodiments of the present invention is configured and operates as the above and therefore has the following effects.

(1) According to the parking control method in one or more embodiments of the present invention, the vehicle can be controlled with the content in accordance with the result of determination as to whether or not an occupant is present inside the vehicle interior of the vehicle. This allows the vehicle to be parked by a method adapted to both the request for parking control when an occupant is present inside the vehicle interior and the request for parking control when no occupant is present inside the vehicle interior. According to the parking control method in one or more embodiments of the present invention, when an occupant is present inside the vehicle interior, the parking control is executed in which the amount of change in the behavior of the vehicle is small and an uncomfortable is less likely to be given to the occupants, and when no occupant is present inside the vehicle interior, the smooth parking control is executed with a shortened parking operation time. According to the parking control method in one or more embodiments of the present invention, by calculating the parking route in accordance with the determination of presence or absence of an occupant, or by calculating the control information in accordance with the determination of presence or absence of an occupant, it is possible to perform the parking process which satisfies both the request when an occupant is present inside the vehicle interior and the request when no occupant is present inside the vehicle interior.

(2) According to the method in one or more embodiments of the present invention, when a determination is made that no occupant is present inside the vehicle interior of the vehicle, the control device 10 controls the vehicle so that the parking operation time is shortened than when a determination is made that an occupant is present inside the vehicle interior of the vehicle. Through this operation, when no occupant is present inside the vehicle interior, the smooth parking control is executed with a shortened parking operation time.

The parking operation time in the method according to one or more embodiments of the present invention is different depending on whether or not an occupant is present inside the vehicle interior of the vehicle when traveling on the same route. The parking operation time as referred to herein may be different depending on whether or not an occupant is present inside the vehicle interior of the vehicle when the travel distance for parking is the same. Moreover, the vehicle can be parked by a method suitable for each of the request when an occupant is present inside the vehicle interior and the request when no occupant is present inside the vehicle interior because the vehicle is controlled to park in accordance with the result of determination as to whether or not an occupant is present inside the vehicle interior of the vehicle. When no occupant is present inside the vehicle interior, it is not necessary to take into account the uncomfortable feeling given to the occupants. In this case, smooth parking with a shortened parking operation time is required. The parking control device 100 executes the parking process with the control content in accordance with whether or not an occupant is present inside the vehicle interior and can therefore respond to respective requirements in both the scene in which an occupant is present and the scene in which an occupant is absent. An occupant who gets out of the vehicle is in a state of performing a parking operation for the vehicle or in a state of waiting for parking completion. In any state, the occupant is restricted in action due to parking, and it is preferred that such time (the time for the occupant to wait) be short. Particularly in specific cases, such as when the climate is hot/cold and when the weather is rain/snow/strong wind, it is preferred to smoothly complete the parking process without delay.

(3) According to the method in one or more embodiments of the present invention, when no occupant is present inside the vehicle interior, the control device 10 calculates a parking route having a larger curvature and/or a larger curvature change rate, with which it is estimated that the behavior of the vehicle is emphasized, than when a determination is made that an occupant is present inside the vehicle interior of the vehicle. When a determination is made that no occupant is present inside the vehicle interior of the vehicle, priority is given to the parking process being rapidly performed rather than the behavior of the vehicle being emphasized. The behavior of the vehicle is accepted to be emphasized and a parking route having a shorter distance can thereby be calculated. The parking route can be shortened and the parking process can thus be rapidly performed.

When no occupant is present inside the vehicle interior, the control device 10 calculates the control information with which the behavior of the vehicle is emphasized than when a determination is made that an occupant is present inside the vehicle interior of the vehicle. When a determination is made that no occupant is present inside the vehicle interior of the vehicle, the behavior of the vehicle is accepted to be emphasized and priority is given to the parking process being rapidly performed. The behavior of the vehicle is emphasized (the vehicle speed, acceleration, deceleration, yaw rate, lateral acceleration, jerk, steering amount, and steering speed are large), but instead, the vehicle can move faster along the parking route. The parking operation time required for parking can be shortened and the parking process can thus be rapidly performed.

(4) According to the method in one or more embodiments of the present invention, when a determination is made that no occupant is present inside the vehicle interior of the vehicle, the parking route is calculated in which the parking operation time required from the start of parking to the completion of parking is shortened than when a determination is made that an occupant is present inside the vehicle interior of the vehicle. When a determination is made that no occupant is present inside the vehicle interior of the vehicle, priority is given to the parking process being rapidly performed. To shorten the parking operation time, reduction in the length of route and increase in the curvature and/or curvature change rate are accepted (the behavior of the vehicle and its change amount are emphasized). Instead, the parking operation time is shortened and the parking process can thus be rapidly performed.

Moreover, when a determination is made that no occupant is present inside the vehicle interior of the vehicle, the control device 10 gives priority to the parking process being rapidly performed than when a determination is made that an occupant is present inside the vehicle interior of the vehicle. To shorten the parking operation time, the behavior of the vehicle is accepted to be emphasized, such as the speed, acceleration, deceleration, yaw rate, steering amount, steering speed, lateral acceleration, and jerk. The parking operation time can be shortened and the parking process can thus be rapidly performed.

(5) According to the method in one or more embodiments of the present invention, when a determination is made that no occupant is present inside the vehicle interior of the vehicle, the control device 10 calculates the parking route having a shorter distance than when a determination is made that an occupant is present inside the vehicle interior of the vehicle. When a determination is made that no occupant is present inside the vehicle interior of the vehicle, priority is given to the parking process being rapidly performed. Instead of accepting increase in the curvature and/or curvature change rate, the parking distance can be shortened. As a result, the parking operation time can be shortened.

(6) According to the method in one or more embodiments of the present invention, when a determination is made that no occupant is present inside the vehicle interior of the vehicle, the control device 10 increases the speed of the vehicle for parking than when a determination is made that an occupant is present inside the vehicle interior of the vehicle. When a determination is made that no occupant is present inside the vehicle interior of the vehicle, priority is given to the parking process being rapidly performed. By setting the vehicle speed to be high, the traveling time along the parking route can be shortened. As a result, the parking process can be rapidly performed.

(7) According to the method in one or more embodiments of the present invention, when a determination is made that no occupant is present inside the vehicle interior of the vehicle, the second parameter used in the process of calculating the target route is set to a value larger than the first parameter used in the process of calculating the target route when an occupant is present inside the vehicle interior of the vehicle. Examples of the second parameter include the maximum curvature, the maximum curvature change rate, and the upper limit steering speed. This allows a shorter parking route to be calculated. By shortening the distance of the parking route, the time required for parking can be shortened.

(8) According to the method in one or more embodiments of the present invention, when a determination is made that no occupant is present inside the vehicle interior of the vehicle, the second parameter used in the process of calculating the target speed is set to a value larger than the first parameter used in the process of calculating the target speed when an occupant is present inside the vehicle interior of the vehicle. Examples of the second parameter include the upper limit acceleration, the upper limit yaw rate, the upper limit lateral acceleration, the upper limit steering speed, the upper limit acceleration jerk, the upper limit deceleration, and the upper limit deceleration jerk. This allows the vehicle to move at a faster speed, and the time required for parking can be shortened.

(9) According to the method in one or more embodiments of the present invention, when a determination is made that no occupant is present inside the vehicle interior of the vehicle, the deceleration time from the start of deceleration to the stop of the vehicle is set short to obtain the target speed; therefore, although the deceleration increases, the parking operation time can be shortened.

(10) According to the method in one or more embodiments of the present invention, when a determination is made that no occupant is present inside the vehicle interior of the vehicle, the parking completion point at which the vehicle is controlled to stop is set to the position at which the vehicle comes into contact with a curbstone. The parking operation time can be shortened because it is not necessary to perform the parking control with a margin so that the vehicle will not hit the curbstone.

(11) According to the method in one or more embodiments of the present invention, contact of a tire of the vehicle with a curbstone is detected on the basis of the change in the behavior of the vehicle. This makes it possible to accurately determine that the vehicle reaches the parking completion point.

(12) According to the method in one or more embodiments of the present invention, when a determination is made that no occupant is present inside the vehicle interior of the vehicle, the vehicle is controlled to stop on the upstream side or downstream side of the parking completion point by the second stop position margin MR2. The second stop position margin MR2 is a value smaller than the first stop position margin MR1. The parking completion point is, for example, the position of a curbstone. When the stop position margin is set to a relatively small value on the upstream side of the parking completion point, the possibility that the vehicle comes into contact with a curbstone is high. When the stop position margin is set on the downstream side of the parking completion point, the vehicle comes into contact with a curbstone. When a determination is made that no occupant is present inside the vehicle interior of the vehicle, by controlling the vehicle to stop in the vicinity of the parking completion point (curbstone), the possibility that the vehicle comes into contact with a curbstone is accepted, and instead, the parking operation time is shortened.

(13) According to the method in one or more embodiments of the present invention, in the case of evaluating the control content (the parking route, the control information) using an evaluation function in which weighting parameters are the shortness of the time required for parking and the smoothness of the behavior of the vehicle, when a determination is made that no occupant is present inside the vehicle interior, the weighting parameter of the shortness of the time required for parking is set to a relatively higher value, and the weighting parameter of the smoothness of the behavior of the vehicle is set to a relatively lower value. This allows the parking route or the control information to be calculated in which priority is given to shortening the parking operation time.

(14) According to the method in one or more embodiments of the present invention, the control device 10 calculates the smoothness of the behavior of the vehicle using any one or more of the longitudinal speed jerk, lateral speed jerk, and yaw jerk. The jerk, which refers to the time derivative of acceleration, is a factor that affects the ride quality for the occupants. The weighting of the smoothness of the behavior of the vehicle can be set to an appropriate value from the viewpoint of the ride quality for the occupants.

(15) According to the method in one or more embodiments of the present invention, when the operation command is acquired from outside of the vehicle interior of the vehicle, a determination can be made that no occupant is present inside the vehicle interior of the vehicle, thereby to determine the presence or absence of an occupant without using the detection information on the vehicle side (such as the output signal from a seating sensor).

(16) The above-described parking control method/method of displaying parking information can be carried out using the parking control apparatus 100 according to one or more embodiments of the present invention. The parking control apparatus 100 according to one or more embodiments of the present invention therefore has the above-described actions and effects.

Embodiments heretofore explained are described to facilitate understanding of the present invention and are not described to limit the present invention. It is therefore intended that the elements disclosed in the above embodiments include all design changes and equivalents to fall within the technical scope of the present invention.

| [Description of Reference Numerals] | | |
|---|---|---|
| 1000 | Parking control system | |
| 100 | Parking control apparatus | |
| | 10 | Control device |
| | | 11    CPU |
| | | 12    ROM |
| | | 13    RAM |
| | 20 | Input device |
| | | 21    Communication device |
| | 30 | Output device |
| | | 31    Display |
| 1a-1d | Cameras | |
| 2 | Image processing device | |
| 3 | Ranging device | |
| 5 | Input terminal device | |
| 200 | Onboard device | |
| | 40 | Drive system |
| | 50 | Steering angle sensor |
| | 60 | Vehicle speed sensor |
| | 70 | Vehicle controller |
| | V1 | Vehicle |
| | V2, V3 | Another vehicle |

The invention claimed is:

1. A parking control method for controlling a vehicle to park on a basis of an operation command acquired from inside or outside of the vehicle, the parking control method comprising:
   making a determination whether or not an occupant is present inside a vehicle interior of the vehicle; and
   when a determination is made that no occupant is present inside the vehicle interior of the vehicle, automatically controlling the vehicle so that
      a target speed at a position at which the vehicle is estimated to come into contact with a curbstone is higher than when a determination is made that an occupant is present inside the vehicle interior of the vehicle, and
      the vehicle is stopped, and the parking control is completed, at a first position relative to the curbstone that is different from a second position at which the vehicle is stopped and the parking control is completed when an occupant is present inside the vehicle, wherein when the determination is made that no occupant is present inside the vehicle interior of the vehicle, the first position is such that the vehicle comes into contact with the curbstone; and when the determination is made that an occupant is present inside the vehicle interior of the vehicle, the second position is such that the vehicle does not come into contact with the curbstone.

2. The parking control method according to claim 1, wherein when a determination is made that no occupant is present inside the vehicle interior of the vehicle, the vehicle is controlled so that a behavior of the vehicle is emphasized than when a determination is made that an occupant is present inside the vehicle interior of the vehicle.

3. The parking control method according to claim 1, wherein when a determination is made that no occupant is present inside the vehicle interior of the vehicle, the vehicle is controlled so that a parking operation time required for completion of the parking is shortened than when a determination is made that an occupant is present inside the vehicle interior of the vehicle.

4. The parking control method according to claim 1, wherein when a determination is made that no occupant is present inside the vehicle interior of the vehicle, a parking route is calculated to be shorter than when a determination is made that an occupant is present inside the vehicle interior of the vehicle, and the vehicle is controlled so as to move along the parking route.

5. The parking control method according to claim 1, wherein when a determination is made that no occupant is present inside the vehicle interior of the vehicle, the vehicle is controlled so that a speed of the vehicle is increased than when a determination is made that an occupant is present inside the vehicle interior of the vehicle.

6. The parking control method according to claim 1, wherein for any one or more of parameters among parameters including a maximum curvature, a maximum curvature change rate, and an upper limit steering speed that are used for calculation of a target route for the vehicle,
the target route for the vehicle to park is calculated through setting a second parameter used when a determination is made that no occupant is present inside the vehicle interior of the vehicle to a higher value than a first parameter used when a determination is made that an occupant is present inside the vehicle interior of the vehicle, and
the vehicle is controlled on a basis of the target route.

7. The parking control method according to claim 1, wherein for any one or more of parameters among parameters including an upper limit acceleration, an upper limit yaw rate, an upper limit lateral acceleration, an upper limit steering speed, an upper limit acceleration jerk, an upper limit deceleration, and an upper limit deceleration jerk that are used for calculation of a target speed of the vehicle,
the target speed for the vehicle to park is calculated through setting a second parameter used when a determination is made that no occupant is present inside the vehicle interior of the vehicle to a higher value than a first parameter used when a determination is made that an occupant is present inside the vehicle interior of the vehicle, and
the vehicle is controlled on a basis of the target speed.

8. The parking control method according to claim 1, wherein for a parameter that is used for calculation of a target speed when the vehicle is stopped and that relates to a deceleration time from start of deceleration to stop of the vehicle,
the target speed for the vehicle to park is calculated through setting a second deceleration time when a determination is made that no occupant is present inside the vehicle interior of the vehicle to a shorter value than a first deceleration time when a determination is made that an occupant is present inside the vehicle interior of the vehicle, and
the vehicle is controlled on a basis of the target speed.

9. The parking control method according to claim 1, wherein contact of a tire of the vehicle with the curbstone is detected on a basis of a change in a behavior of the vehicle.

10. The parking control method according to claim 1, wherein when a determination is made that no occupant is present inside the vehicle interior of the vehicle,
the target speed for the vehicle to park is calculated through setting a stop position margin to a parking completion point for the vehicle to a smaller value than when a determination is made that an occupant is present inside the vehicle interior of the vehicle.

11. The parking control method according to claim 1, wherein in a case of evaluating the parking control using an evaluation function in which weighting parameters are shortness of a time required for the parking and smoothness of a behavior of the vehicle, when a determination is made that no occupant is present inside the vehicle interior,
the weighting parameter of the shortness of the time required for parking is set to a higher value than when a determination is made that an occupant is present inside the vehicle interior of the vehicle, and
the weighting parameter of the smoothness of the behavior of the vehicle is set to a lower value than when a determination is made that an occupant is present inside the vehicle interior of the vehicle.

12. The parking control method according to claim 11, wherein the smoothness of the behavior of the vehicle is obtained using any one or more of a longitudinal speed jerk, a lateral speed jerk, and a yaw jerk.

13. The parking control method according to claim 1, wherein when the operation command is acquired from outside of the vehicle interior of the vehicle, a determination is made that no occupant is present inside the vehicle interior of the vehicle.

14. A parking control apparatus comprising:
a processor configured to control a vehicle in accordance with an operation command acquired from inside or outside of a vehicle,
the processor being configured to:
make a determination whether or not an occupant is present inside a vehicle interior of the vehicle; and
when a determination is made that no occupant is present inside the vehicle interior of the vehicle, automatically control the vehicle so that
a target speed at a position at which the vehicle comes into contact with a curbstone is higher than when a determination is made that an occupant is present inside the vehicle interior of the vehicle, and
the vehicle is stopped, and the parking control is completed, at a first position relative to the curbstone that is different from a second position at which the vehicle is stopped and the parking control is completed when an occupant is present inside the vehicle, wherein
when the determination is made that no occupant is present inside the vehicle interior of the vehicle, the first position is such that the vehicle comes into contact with the curbstone; and when the determination is made that an occupant is present inside the vehicle interior of the vehicle, the second position is such that the vehicle does not come into contact with the curbstone.

\* \* \* \* \*